(12) United States Patent
Quartararo (10) Patent No.: US 10,731,896 B2
(45) Date of Patent: Aug. 4, 2020

(54) VERSATILE CLEANSING AND SANITIZING WATER DISPENSER AND METHODS OF PRODUCTION

(71) Applicant: Stephanie Quartararo, Studio City, CA (US)

(72) Inventor: Stephanie Quartararo, Studio City, CA (US)

( * ) Notice: Subject to any disclaimer, the term of this patent is extended or adjusted under 35 U.S.C. 154(b) by 396 days.

(21) Appl. No.: 15/647,685

(22) Filed: Jul. 12, 2017

(65) Prior Publication Data

US 2017/0370617 A1  Dec. 28, 2017

Related U.S. Application Data

(63) Continuation-in-part of application No. 12/324,195, filed on Nov. 26, 2008, now abandoned.

(60) Provisional application No. 60/990,577, filed on Nov. 27, 2007.

(51) Int. Cl.
| | |
|---|---|
| *F24H 9/20* | (2006.01) |
| *F24H 1/00* | (2006.01) |
| *F24H 1/06* | (2006.01) |
| *B65D 47/06* | (2006.01) |

(52) U.S. Cl.
CPC ........... *F24H 9/2071* (2013.01); *B65D 47/06* (2013.01); *F24H 1/0018* (2013.01); *F24H 1/06* (2013.01)

(58) Field of Classification Search
CPC .... A47J 21/21008; A47J 21/21; A47J 21/016; A47J 31/56; A47J 31/40; A47J 31/52; A47J 31/401; A47J 31/60; A47J 31/41; A47J 47/01; G01F 11/023; G01F 11/028; F24H 9/2071; F24H 9/2014; F24H 1/0018;
(Continued)

(56) References Cited

U.S. PATENT DOCUMENTS

| | | | | |
|---|---|---|---|---|
| 5,671,325 A | * | 9/1997 | Roberson | A47J 31/41 222/146.5 |
| 8,056,764 B2 | * | 11/2011 | Paasch | G01F 11/028 219/433 |

(Continued)

*Primary Examiner* — Shawntina T Fuqua
(74) *Attorney, Agent, or Firm* — Sandra P. Thompson; Finlayson Toffer (57) ABSTRACT

A cleansing and sanitizing water dispensing device and related methods are described herein that includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes a locking mechanism and wherein the locking mechanism is operatively coupled to the heating mechanism, the dispensing mechanism, or a combination thereof. In some embodiments, a cleansing and sanitizing water dispensing device includes an integrated safety device, wherein the safety device includes an integrated spill tray, wherein the device or the heating mechanism will not operate unless the integrated spill tray is engaged and pulled out, so that it extends away from the dispensing device.

10 Claims, 5 Drawing Sheets

(58) Field of Classification Search
CPC ....... F24H 1/06; B65D 47/06; C02F 2303/04; C02F 1/02
See application file for complete search history.

(56) References Cited

U.S. PATENT DOCUMENTS

2006/0278093 A1* 12/2006 Biderman ............... A47J 31/40
99/282
2008/0041236 A1* 2/2008 Raouf ................... A47J 31/401
99/323.3

* cited by examiner

VERSATILE CLEANSING AND SANITIZING WATER DISPENSER AND METHODS OF PRODUCTION

This application is a continuation in part of U.S. Utility Application Ser. No. 12/324,195 that is based on U.S. Provisional Application Ser. No. 60/990577 filed on Nov. 27, 2007, both of which are commonly-owned and incorporated herein in its entirety.

FIELD OF THE SUBJECT MATTER

The field of the subject matter is a versatile cleansing and sanitizing water dispenser, along with methods of production and use of the contemplated dispensers.

BACKGROUND

Parents, hospitals and child-care workers have been looking for safe and healthy methods and devices to clean surfaces associated with babies and children, and their surrounding spaces. Cleaning surrounding spaces has become a more complicated task, because of germs, bacteria, dirt and other materials, such as allergens. The latest solution to this problem has been to introduce bleach and other chemicals to cleaning solutions. Although chemicals are generally effective at cleaning spaces, it is becoming clear that these chemicals can cause short-term and long-term health problems, including allergies, headaches and skin rashes.

In both instances of cleaning surfaces and surrounding spaces, it is clear that there is a need for those devices and methods to be portable, versatile and as safe as possible with built in reliable safety features. It would also be ideal for these devices and methods to be consolidated into one all-purpose device. There are devices currently used to heat water to boiling or slightly lower than boiling, such as electric tea kettles or hot pot devices; however, these devices are not designed to or capable of holding water at temperatures significantly below boiling. Fortunately and surprisingly, a device, which is described herein, has been developed that meets all of these needs and goals.

SUMMARY OF THE SUBJECT MATTER

A cleansing and sanitizing water dispensing device is described herein that includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes a locking mechanism and wherein the locking mechanism is operatively coupled to the heating mechanism, the dispensing mechanism, or a combination thereof. In some embodiments, a cleansing and sanitizing water dispensing device includes an integrated safety device, wherein the safety device includes an integrated spill tray, wherein the device or the heating mechanism will not operate unless the integrated spill tray is engaged and pulled out, so that it extends away from the dispensing device.

A method of cleansing and sanitizing a surface, includes: providing a surface, wherein the surface comprises at least one type of bacteria; providing a water dispensing device, wherein the device includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes a locking mechanism and wherein the locking mechanism is operatively coupled to the heating mechanism, the dispensing mechanism, or a combination thereof; providing water; heating the water to a predetermined temperature above 130° F.; dispensing the heated water onto a cloth or sponge to produce a wet cloth or wet sponge; and wiping the surface with the wet cloth or wet sponge to sanitize the surface.

Another contemplated method of cleansing and sanitizing a surface, includes: providing a surface, wherein the surface comprises at least one type of bacteria; providing a water dispensing device, wherein the device includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes wherein the safety device includes an integrated spill tray, wherein the device or the heating mechanism will not operate unless the integrated spill tray is engaged and pulled out, so that it extends away from the dispensing device; providing water; heating the water to a predetermined temperature above 130° F.; dispensing the heated water onto a cloth or sponge to produce a wet cloth or wet sponge; and wiping the surface with the wet cloth or wet sponge to sanitize the surface.

DETAILED DESCRIPTION

Surprisingly, a comprehensive portable device that is versatile and safe for cleaning and sanitizing surfaces and surrounding areas has been developed. Contemplated devices heat and hold water temperatures at significantly lower than boiling temperature, so as to be safe for infants and children. It should be understood that contemplated embodiments are directed to cleansing and sanitizing areas and items, and therefore, the liquids utilized in contemplated embodiments are at temperatures that are significantly higher than the temperature required for consumption of liquids.

As an example, U.S. Pat. No. 8,056,764 issued to Paasch is directed to heating or keeping warm a "liquid food product" for consumption purposes, wherein the temperature is less than 120F. The Paasch reference also states that the temperature is important to keep as low as possible, to ensure that the liquid food products don't separate or become unusable, such as separated oils or butters. The Paasch reference is very clear about what a "liquid food product" is and it is not water and it is not water heated to a temperature that can sanitize a surface, a cloth or another item, as claimed herein. One of ordinary skill in the art who wants to sanitize a surface, a cloth or another item isn't going to read Paasch and consider replacing the "liquid food product" designed for consumption with water that is designed for sanitizing, since the temperature for sanitization should be above 130F.

It is clearly stated in Column 2 of the Paasch reference that the apparatus is used to hold and dispense butter, oil, or another liquid food product that may be heated, but is entirely used for consumption purposes. One of ordinary skill in the art isn't going to review the Paasch reference—an invention designed for keeping butter and oil heated and liquefied for human consumption—and consider it a suitable disclosure for a cleansing water device designed to heat and dispense water that is at a temperature suitable to sanitize a surface, a cloth or another item. They are not the same, don't have the same functionality and aren't designed to produce the same or a similar outcome.

Another patent, U.S. Pat. No. 5,671,325 issued to Roberson discloses a device meant to heat water to a consumption temperature, is meant to be portable and is not meant for storage of liquids. As a matter of fact, Roberson specifically says that the "temperature is desirable for instant consumption by an infant". In addition, Roberson teaches that these contemplated devices can be used in cars or moving vehicles. The fact that Roberson indicates that this device can be used in a car is a key reason why one of ordinary skill in the art wouldn't consider it for heating water above 130F. Heating water like that in a moving car would be an extreme safety hazard and one of ordinary skill understands this.

Another difference between current embodiments and the Roberson reference is the water reservoir. In Roberson, it is specifically stated that the water reservoir is kept on the small side to keep water from becoming stagnant or populated with microorganisms. In the current application, the device is used for cleansing, so the water is heated to above 130F and the boiling point of the liquid. This temperature means that water will not be provided by the system that is stagnant or populated with microorganisms, since the water is heated to at least a sanitizing temperature.

In yet another difference between contemplated embodiments and the references discussed herein—they do not have sufficient safety features to protect children and users from burns and hot water spills. Paasch does not contemplated their device being mobile enough or heating liquids enough to require a locking mechanism or an integrated spill tray that is operatively tied to the controls of the device. Roberson has a spillage reservoir, but the spillage reservoir in Roberson is not operatively connected to the device in such a way where the device will not operate if the spillage reservoir is not engaged and pulled out from the main body of the device.

As contemplated, a cleansing and sanitizing water dispensing device, includes: a heating mechanism, wherein the heating mechanism heats water to a predetermined temperature, wherein the predetermined temperature is above 130° F. and the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes a locking mechanism, a power controller coupled with an integrated spill tray or a combination thereof.

Contemplated versatile cleansing and sanitizing water dispensing devices are shown in FIGS. 1 through 8, which will be described in detail herein, and include a device having a reservoir and heating mechanism, whereby water is stored and heated to a predetermined temperature for dispensing and use for cleaning and sanitizing surfaces and the surrounding spaces.

Contemplated heating mechanisms comprise a suitable heating element, wherein the heating element may comprise an independent heating element, along with a heating element for the reservoirs. In some embodiments, the independent heating reservoir may comprise a heated contact area for receiving a dish, a plate or a cloth receptacle.

Contemplated devices may comprise a power element and be powered by electricity, battery power, solar power or a combination thereof.

Figure 1:
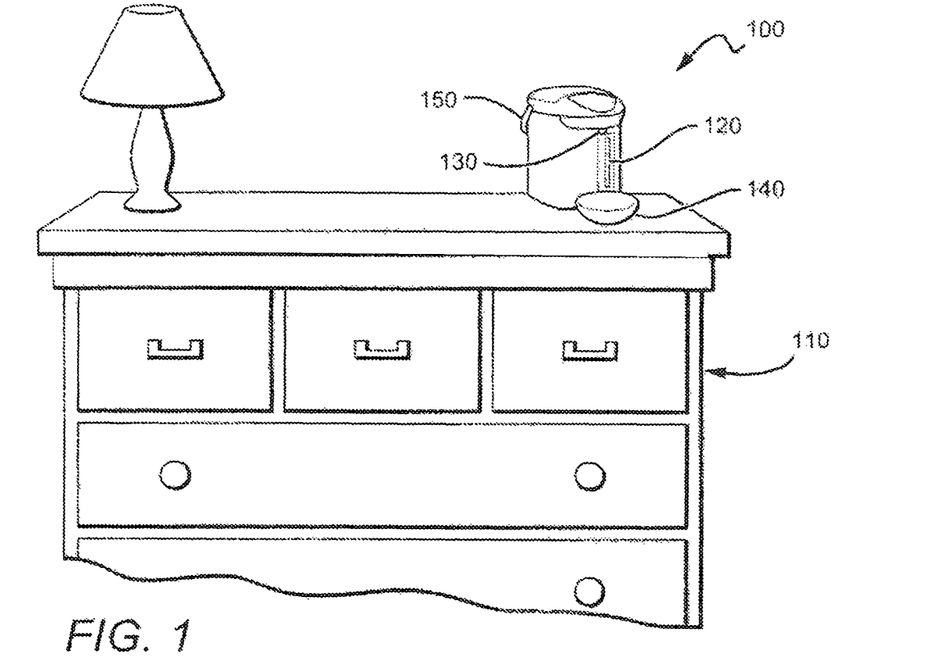
FIG. 1 shows a contemplated cleansing and sanitizing water dispensing device located on top of a baby's cabinet.

FIG. 1 shows a contemplated cleansing and sanitizing water dispensing device 100 located on top of a baby's cabinet 110. A contemplated cleansing and sanitizing water dispensing device is described that includes a heating mechanism (not shown); a liquid reservoir 120 coupled to the heating mechanism, and a dispensing mechanism 130 coupled to the liquid reservoir 120. This contemplated embodiment also comprises a handle 150. In front of the cleansing and sanitizing water dispensing device 100 is a bowl 140 utilized as a spill tray. FIG. 1 shows how compact these contemplated devices can be in a baby's or children's room.

Figure 2:
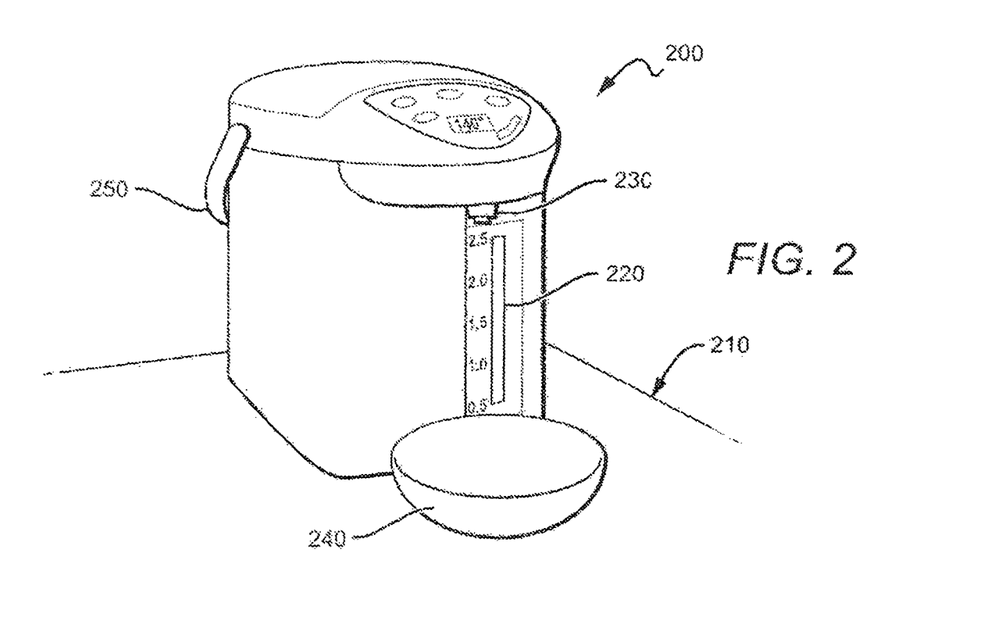
FIG. 2 shows a perspective view of a contemplated cleansing and sanitizing water dispensing device.

FIG. 2 shows a closer perspective view of a contemplated cleansing and sanitizing water dispensing device 200 located on top of a baby's cabinet 210. A contemplated cleansing and sanitizing water dispensing device is described that includes a heating mechanism (not shown); a liquid reservoir 220 coupled to the heating mechanism, and a dispensing mechanism 230 coupled to the liquid reservoir 220. This contemplated embodiment also comprises a handle 250. In front of the cleansing and sanitizing water dispensing device 200 is a bowl 240 utilized as a spill tray.

The reservoir for contemplated devices is designed to hold a suitable amount of water or another suitable liquid, such that the device can remain portable, while at the same time not needing to be filled up every day or week. In some contemplated embodiments, the reservoir can hold up to five liters of liquid, such as water. In other embodiments, the reservoir can hold up to three liters of liquid, such as water. In yet other embodiments, the reservoir can hold up to one liter of water. Also, contemplated reservoirs are designed to hold tap water, bottled water, distilled water or saline solution, if needed. In some embodiments, the reservoir in the device reboils the water and descales itself, so that its not necessary to use distilled water unless desired.

Figure 3:
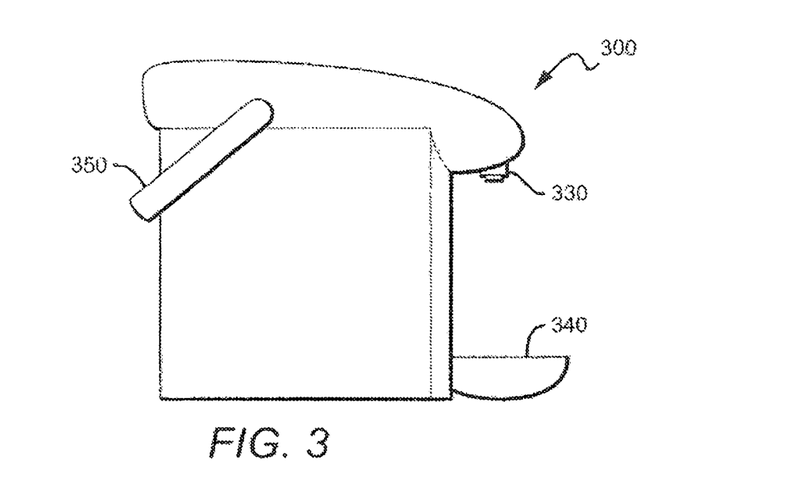
FIG. 3 shows a side perspective of a contemplated cleansing and sanitizing water dispensing device.

FIG. 3 shows a side perspective of a contemplated cleansing and sanitizing water dispensing device 300. In this view, the dispensing mechanism 330 is shown, along with the handle 350. The bowl 340 that is utilized for the spill tray is also shown.

Contemplated devices designed to dispense suitable liquids at a pre-set temperature into a separate or integrated bowl or dish to be used with a washcloth or directly onto a washcloth. The heated liquid or water can then be used to clean the skin or to clean surrounding areas depending on the temperature of the water. Therefore, contemplated devices may have at least one temperature setting. In some embodiments, contemplated devices have more than one temperature setting, wherein the settings are designed to be in a range of appropriate temperature to clean surfaces, such as above 120° F., and certainly above 130F. The temperature settings are clearly marked and/or indicated on contemplated devices, primarily for safety reasons. The temperature of the liquid or liquids in contemplated devices is controlled by any suitable internal temperature device, as mentioned earlier. Foodsafetysite.com states that for water to be considered at an appropriate sanitizing temperature, it must be at least 165F, and in some embodiments, at least 171F. These temperatures are contemplated herein for contemplated devices and methods. A predetermined temperature of close to or at 130F may be appropriate, if there is a chemical added to the water, wherein the chemical heated in water to 130F is sufficient for the mixture to sanitize a surface.

In some embodiments, the predetermined temperature comprises a temperature less than the boiling temperature of the liquid. In other embodiments, the predetermined temperature comprises a temperature that is at least 10 percent lower than the boiling temperature of the liquid. In yet other embodiments, the predetermined temperature comprises a temperature that is at least 25 percent lower than the boiling temperature of the liquid. In some contemplated embodiments, the predetermined temperature comprises a sanitizing temperature, meaning that the temperature of the liquid can—at least in part—sanitize a surface, cloth or other item.

The phrase "sanitizing temperature" does not refer to sanitizing the water, but instead refers to sanitizing a surface or object with the hot water. These higher temperatures are not taught or suggested in available references, because, for example in Roberson, this reference specifically teaches against higher temperatures in the Background. The higher temperatures are not desirable or contemplated based completely on the intended use of the Roberson device—infant formula. Devices that generate higher temperatures are specifically taught against by Roberson, which would explicitly lead one of ordinary skill in the art to not consider those devices as suitable at all. And given that Roberson teaches against these higher temperatures—it cannot be combined with Paasch, because that is simple illogical when looking at one of ordinary skill in the art and what they would consider combining. This combination of Roberson and Paasch is especially not considered by one of ordinary skill in the art, because the higher temperatures require safety mechanisms in place to protect users from burns. Paasch does not have liquids high enough to require safety mechanisms, and neither does Roberson. Roberson is designed to produce liquids that are immediately safe for infants to drink—so why would a safety mechanism designed to protect a user from burns be necessary? It wouldn't.

Contemplated cleansing and sanitizing water dispensing device may comprise at least one control device to control the operation and use of the cleansing and sanitizing water dispensing device. In some embodiments, the at least one control device may comprise at least one touch pad, at least one switch, at least one knob or a combination thereof. The control device may comprise digital circuitry, analog circuitry or a combination thereof.

A suitable dispenser is coupled with the reservoir in order to move water from the reservoir to the outside of the device. These dispensers may comprise any collection of tubing, pipes, and recesses. In addition, these dispensers may be constructed out of any suitable material, such as metals or high-performance plastics and composites.

Figure 4:
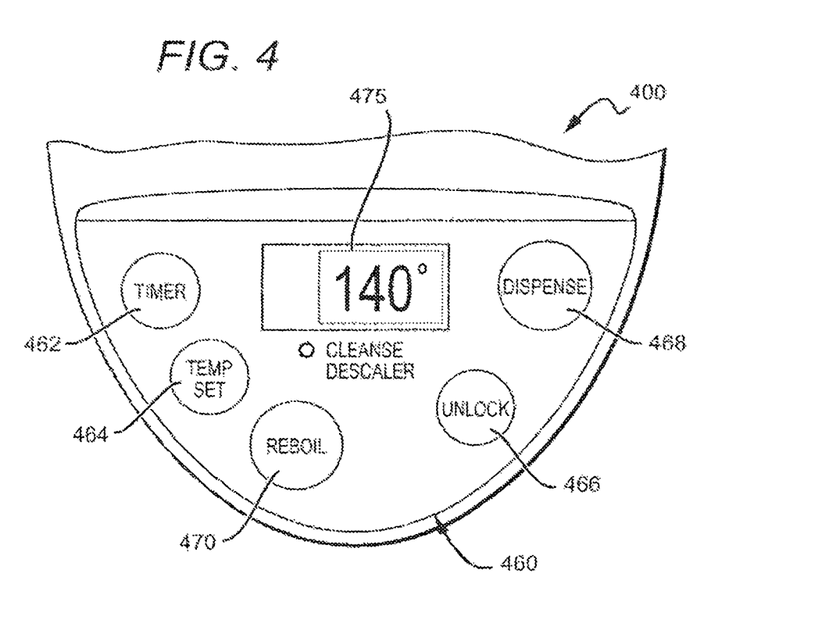
FIG. 4 shows a touch pad control device on a contemplated cleansing and sanitizing water dispensing device.

FIG. 4 shows a touch pad control device 460 on the top of a contemplated cleansing and sanitizing water dispensing device 400. Several controls are shown on this particular control device 460, such as the timer 462, the temperature control 464, the unlock button 466, the dispense button 468 and the reboil button 470 utilized to reheat the water. A temperature indicator 475 is also shown on the control device 460.

Figure 5:
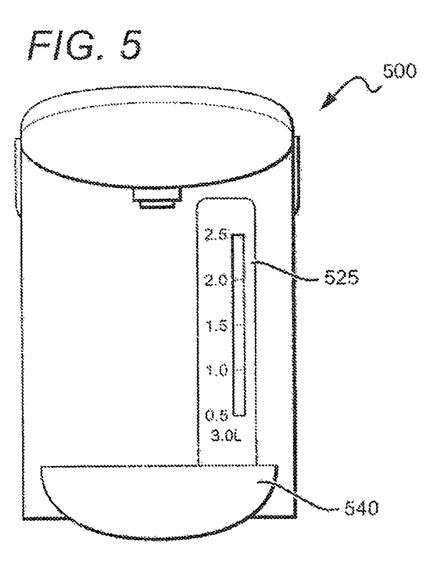
FIG. 5 shows a reservoir indicator device on a contemplated cleansing and sanitizing water dispensing device.

FIG. 5 shows a reservoir indicator device 525 on a contemplated cleansing and sanitizing water dispensing device 500. This particular reservoir indicator device 525 shows that the cleansing device 500 holds three (3) liters of liquid, such as water. The bowl 540 that is utilized for the spill tray is also shown.

Figure 6:
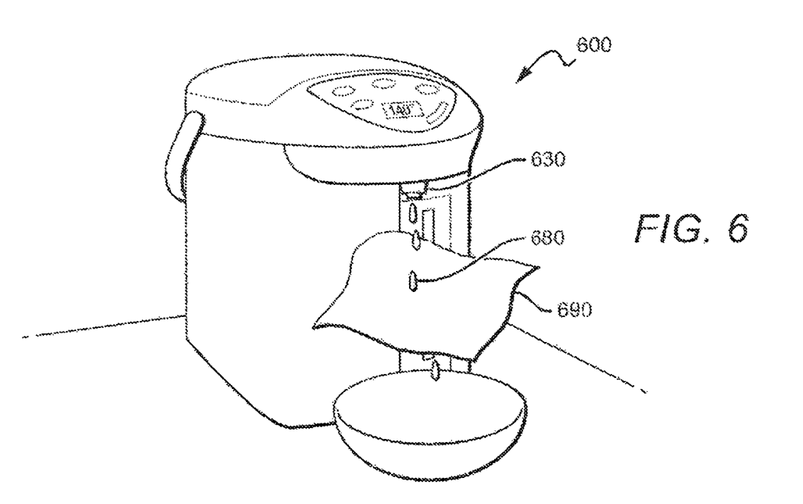
FIG. 6 shows a dispenser device on a contemplating cleansing and sanitizing water dispensing device, wherein a liquid is being dispensed onto a cloth for use.

FIG. 6 shows a dispensing mechanism 630 on a contemplating cleansing and sanitizing water dispensing device 600, wherein a liquid 680 is being dispensed onto a cloth 690 for use. The bowl 640 that is utilized for the spill tray is also shown.

Figure 7:
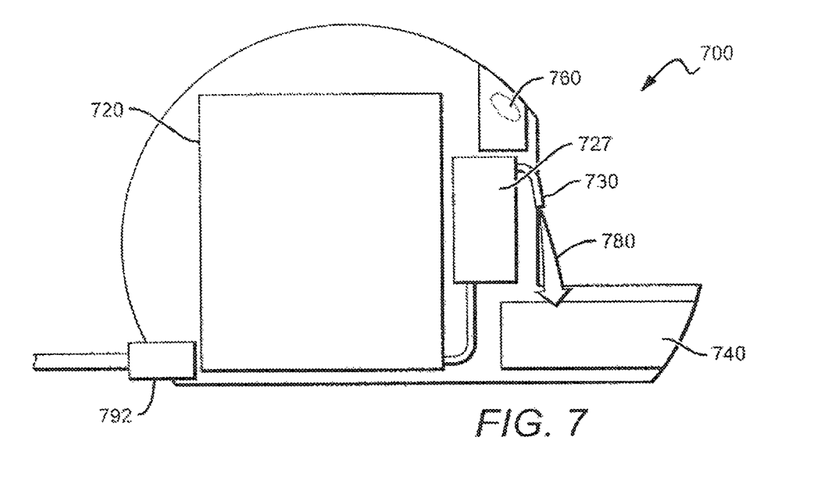
FIG. 7 shows a contemplated cleansing and sanitizing water dispensing device with an integrated spill tray.
Figure 8A:
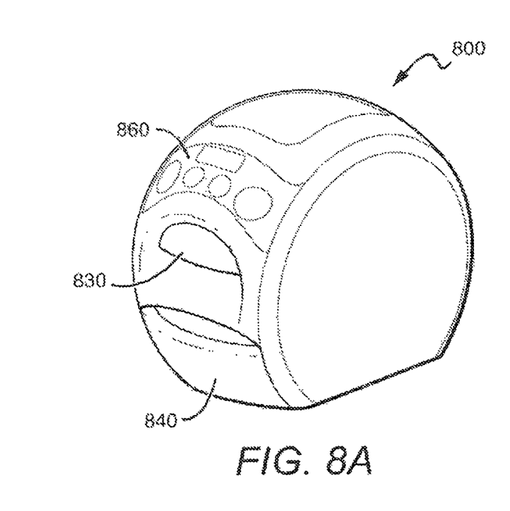
FIGS. 8A and 8B show perspective views of a contemplated cleansing and sanitizing water dispensing device 800 with an integrated spill tray 840.
Figure 8B:
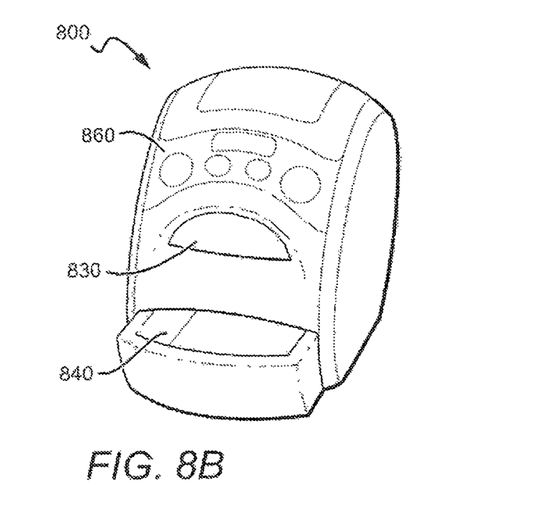

In another contemplated embodiment, as shown in FIG. 7, a contemplated cleansing and sanitizing water dispensing device 700 comprises an integrated spill tray 740. In this embodiment, a pump 727 is coupled to the reservoir 720 and the dispensing mechanism 730 that is designed to direct liquid 780 from the reservoir 720 to the dispensing mechanism 730. This embodiment also shows a power plug 792 and a control panel 760. In some embodiments, the reservoir may be directly coupled to the dispensing mechanism without the use of a pump. FIGS. 8A and 8B show perspective views of a contemplated cleansing and sanitizing water dispensing device 800 with an integrated spill tray 840. In this embodiment, a dispensing mechanism 830 is shown. This embodiment also shows a control panel 860. In this embodiment, the device—at the very least the heating element—will not operate unless the integrated spill tray is engaged and pulled out, so that it remains coupled to but extends away from the dispensing device.

A contemplated safety feature of the cleansing and sanitizing water dispensing devices disclosed herein is that the device can lock or be secured in such a manner so that babies and children cannot open the device or get burned if it leans or tips over during use. These safety features are key to the device, because contemplated devices are designed to sit on a changing table, a dresser, a table top or other low surface. They are designed to be in use most, if not all, of the time, primarily so that users can have hot water at their disposal when they need it most. In some embodiments, contemplated safety features will take the form of a locking mechanism, wherein the locking mechanism is coupled to the heating element or mechanism, the dispenser or dispensing mechanism, or a combination thereof, and wherein the locking mechanism is engaged or can be engaged when the heating element or mechanism is in use or when water exceeds 130F. Another safety feature found in some contemplated embodiments is that the device will not power up or operate unless the integrated spill tray is engaged and pulled out, so that it extends away from the dispensing device, as shown in FIG. 8B.

In some embodiments, contemplated devices comprise a holder or dispenser for dispensing or containing disposable cloths or towels to use with the device. This refillable holder may be designed to merely hold a stack of disposable cloths or may be designed to manually or automatically dispense cloths or towels in a similar fashion to a paper towel holder, a public bathroom towel holder or an automatic dispenser having a push button or sensor that when activated dispenses towels or cloths.

In contemplated embodiments, a surface may contain at least one type of bacteria, organism, virus, or combination thereof that would necessitate that the surface be sanitized.

Figure 9:
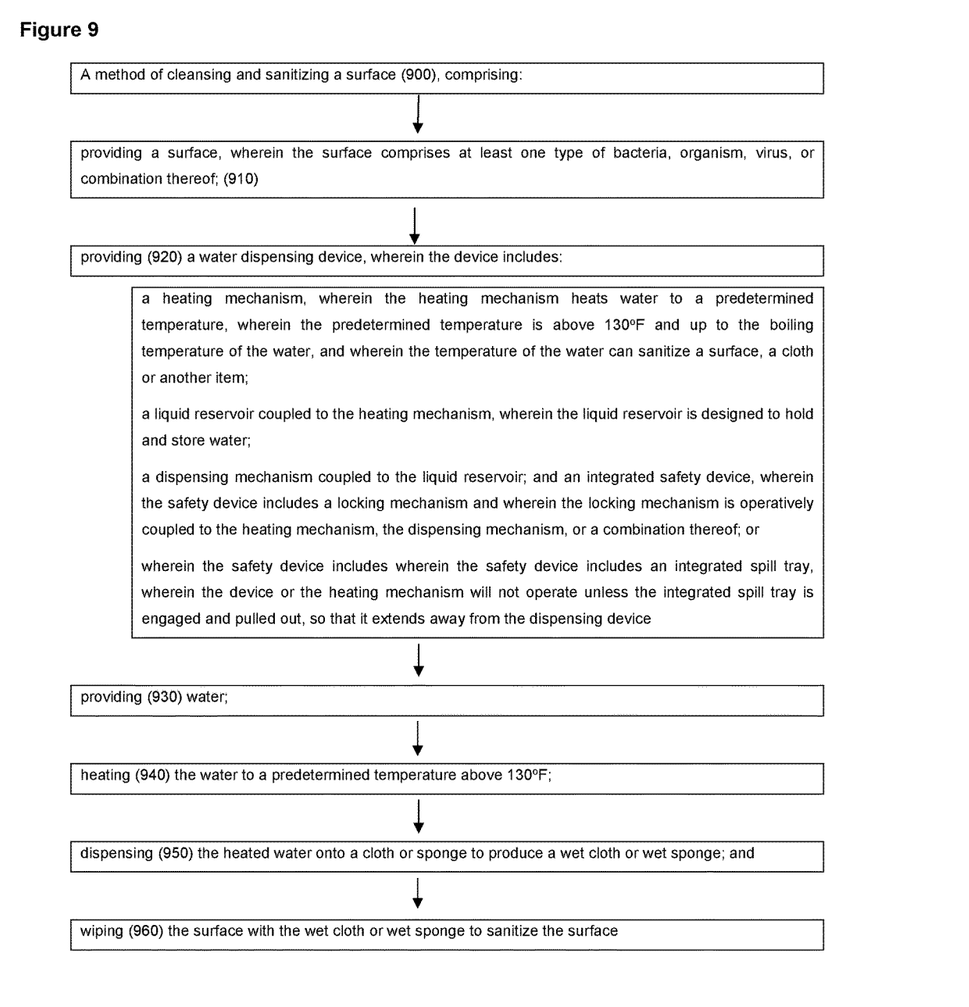
FIG. 9 shows a contemplated method.

A method (900) of cleansing and sanitizing a surface is shown in FIG. 9 and includes: providing (910) a surface, wherein the surface comprises at least one type of bacteria; providing (920) a water dispensing device, wherein the device includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes a locking mechanism and wherein the locking mechanism is operatively coupled to the heating mechanism, the dispensing mechanism, or a combination thereof; providing (930) water; heating (940) the water to a predetermined temperature above 130° F.; dispensing (950) the heated water onto a cloth or sponge to produce a wet cloth or wet sponge; and wiping (960) the surface with the wet cloth or wet sponge to sanitize the surface.

Another contemplated method of cleansing and sanitizing a surface, includes: providing a surface, wherein the surface comprises at least one type of bacteria; providing a water dispensing device, wherein the device includes: a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item; a liquid reservoir coupled to the heating mechanism, wherein the liquid reservoir is designed to hold and store water; a dispensing mechanism coupled to the liquid reservoir; and an integrated safety device, wherein the safety device includes wherein the safety device includes an integrated spill tray, wherein the device or the heating mechanism will not operate unless the integrated spill tray is engaged and pulled out, so that it extends away from the dispensing device; providing water; heating the water to a predetermined temperature above 130° F.; dispensing the heated water onto a cloth or sponge to produce a wet cloth or wet sponge; and wiping the surface with the wet cloth or wet sponge to sanitize the surface.

Contemplated devices may also be utilized with additional liquids or substances, including baby oil, natural oil, aromatic or essential oils, skin cleanser, lotion, pharmaceutical preparations or a combination thereof. These additional liquids or substances may be utilized in the primary reservoir or may be utilized in at least one additional reservoir or smaller independent reservoir.

Contemplated devices do not need to be reserved for use in homes with children and babies, but can be used to clean up after pets and adults. In addition, contemplated devices can be used in kennels, hospitals and nursing homes. Also, these devices are designed to be portable, so they can be moved around indoors and also can be taken on trips and to other locations. The battery operation feature would be especially useful for traveling, since outlets are not available in cars, boats or RVs. And given the temperatures obtained by contemplated devices, integrated safety features, such as a locking mechanism or integrated spill tray are necessary.

Thus, specific embodiments and applications of cleansing and sanitizing water dispensing devices and their methods of production and use have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A cleansing and sanitizing water dispensing device, comprising:
   a heating mechanism, wherein the heating mechanism heats water to a predetermined temperature, wherein the predetermined temperature is above 130° F. and up to the boiling temperature of the water, and wherein the temperature of the water can sanitize a surface, a cloth or another item;
   a liquid reservoir coupled to the heating mechanism, wherein the liquid reservoir is designed to hold and store water;
   a dispensing mechanism coupled to the liquid reservoir; and
   an integrated safety device, wherein the safety device includes an integrated spill tray, wherein the device or the heating mechanism will not operate unless the integrated spill tray is engaged and pulled out, so that it extends away from the dispensing device.

2. The cleansing and sanitizing water dispensing device of claim 1, comprising at least one additional liquid reservoir.

3. The cleansing and sanitizing water dispensing device of claim 2, wherein the at least one additional liquid reservoir may hold baby oil, natural oil, aromatic oils, skin cleanser, lotion, pharmaceutical preparations or a combination thereof.

4. The cleansing and sanitizing water dispensing device of claim 1, wherein the heating mechanism comprises a heating element.

5. The cleansing and sanitizing water dispensing device of claim 1, further comprising a power element.

6. The cleansing and sanitizing water dispensing device of claim 5, wherein the power element comprises electric power, battery power, solar power or a combination thereof.

7. The cleansing and sanitizing water dispensing device of claim 1, further comprising at least one control device.

8. The cleansing and sanitizing water dispensing device of claim 7, wherein the at least one control device comprises at least one touch pad, at least one switch, at least one knob or a combination thereof.

9. The cleansing and sanitizing water dispensing device of claim 1, further comprising an independent heating element.

10. The cleansing and sanitizing water dispensing device of claim 9, wherein the independent heating element comprises a heated contact area for receiving a dish, plate or cloth receptacle.

* * * * *